United States Patent [19]

Kiuchi et al.

[11] 4,114,009
[45] Sep. 12, 1978

[54] SWITCHING AND HEAT CONTROL MECHANISM FOR INDUCTION HEATING COOKING APPARATUS HAVING A PLURALITY OF WORK COILS

[75] Inventors: Mitsuyuki Kiuchi; Keizo Amagami, both of Kadoma; Shigeru Maeda; Shigeharu Saegusa, both of Osaka, all of Japan

[73] Assignees: Matsushita Electric Industrial Co., Ltd.; Kyokuto Electric Company, Limited, both of Japan

[21] Appl. No.: 764,983

[22] Filed: Feb. 2, 1977

[30] Foreign Application Priority Data

Feb. 3, 1976 [JP] Japan .................. 51-11032

[51] Int. Cl.$^2$ ............................. H05B 5/04
[52] U.S. Cl. ................. 219/10.49 R; 200/17 R; 219/10.77
[58] Field of Search ............. 219/10.49, 10.77, 10.79; 200/6 B, 6 BA, 6 C, 17 R, 18 R, 153 LB, 153 V, 153 S, 52 R, 61.58 R

[56] References Cited

U.S. PATENT DOCUMENTS

| 3,898,410 | 8/1975 | Peters | 219/10.49 |
| 3,987,268 | 10/1976 | Maeda et al. | 219/10.49 |
| 3,989,916 | 11/1976 | Amagami et al. | 219/10.77 |
| 4,010,342 | 3/1977 | Austin | 219/10.77 |

Primary Examiner—Bruce A. Reynolds
Attorney, Agent, or Firm—Lowe, King, Price & Becker

[57] ABSTRACT

A switching and heat control mechanism for induction heating cooking apparatus having a plurality of induction heating work coils comprises a single control shaft provided with a plurality of contact operating members. A plurality of switch contact units operable by the corresponding contact operating members provide different combinations of open and closed circuit conditions for various points of the apparatus in sequence as the control shaft is rotated. An elevating mechanism, carrying an associated work coil, moves the coil up and down in response to the angle of rotation of the control shaft to form a variable, power level controlling gap between the coil and a load placed on a nonmagnetic cook top.

10 Claims, 6 Drawing Figures

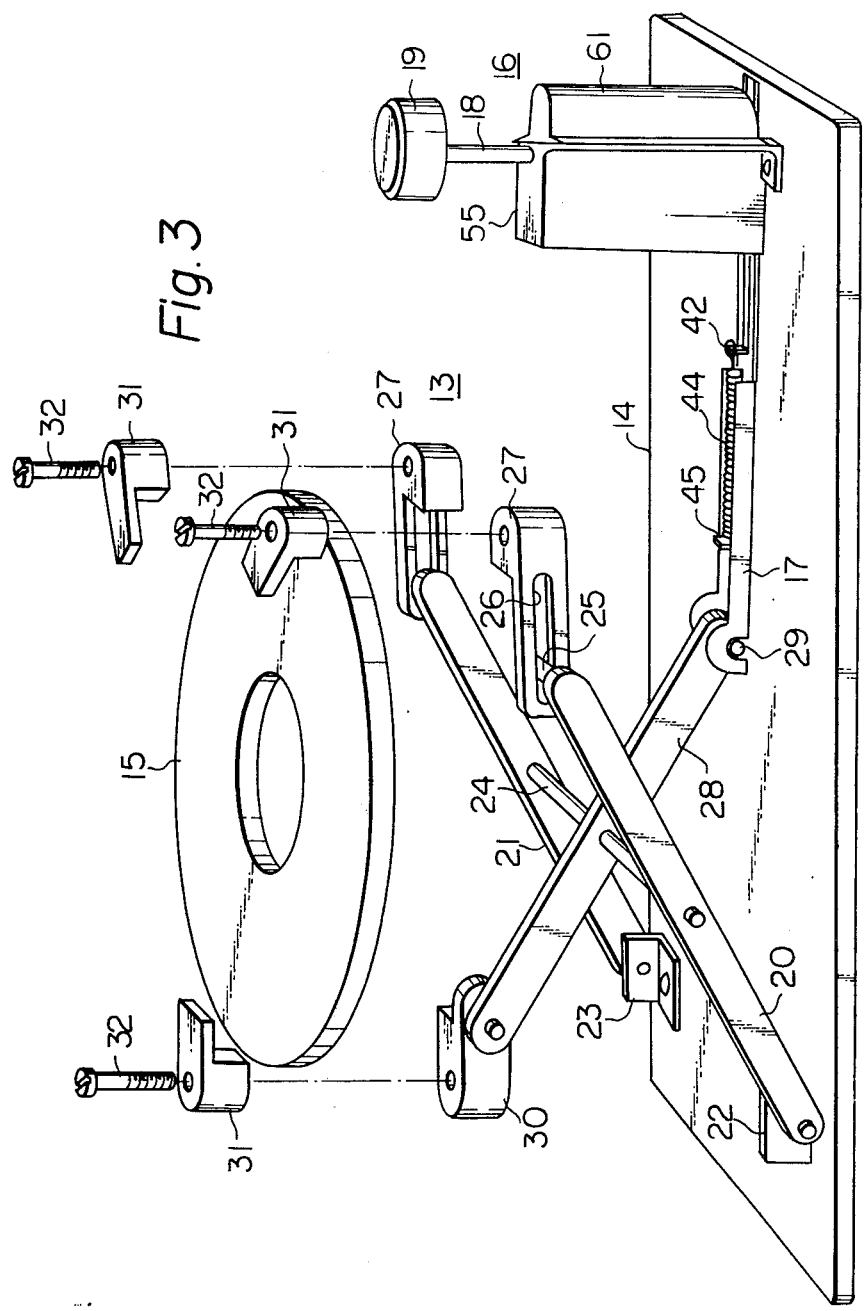

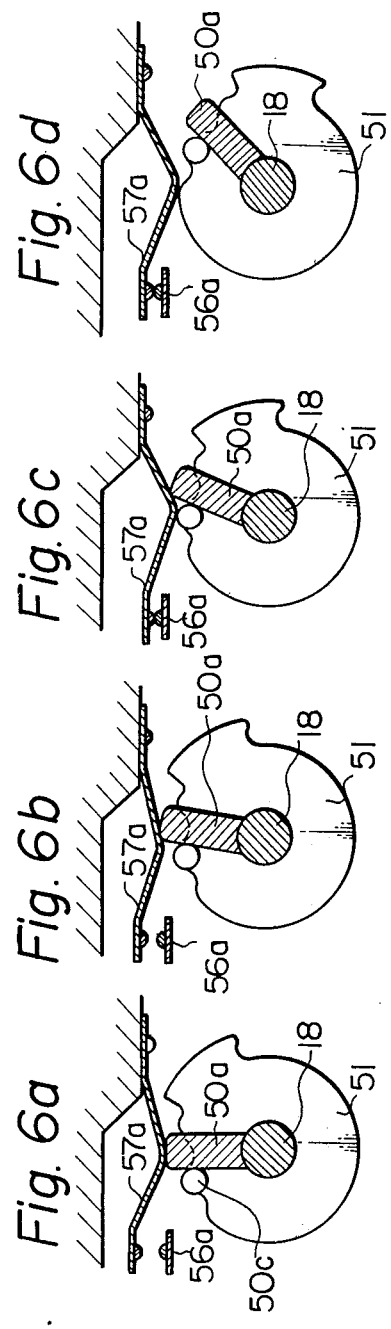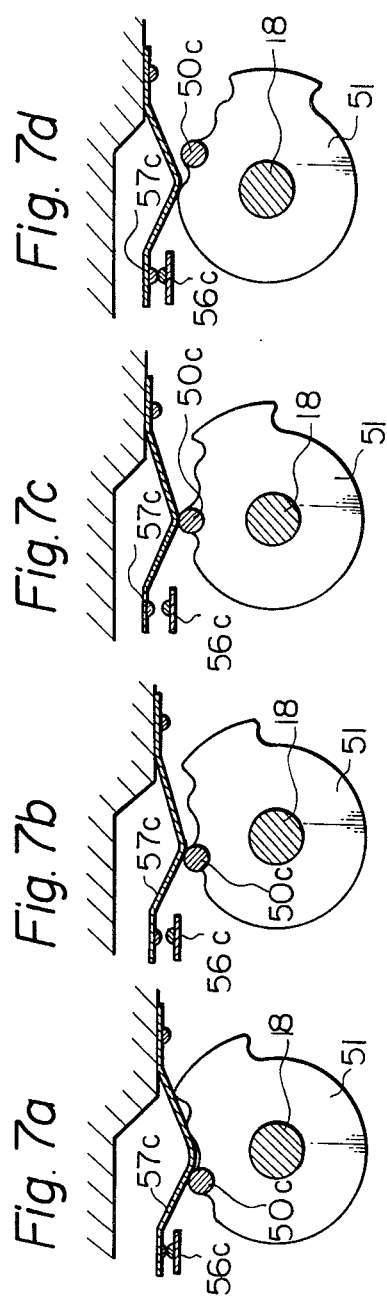

SWITCHING AND HEAT CONTROL MECHANISM FOR INDUCTION HEATING COOKING APPARATUS HAVING A PLURALITY OF WORK COILS

FIELD OF THE INVENTION

The present invention relates generally to induction heating cooking apparatus having a plurality of induction heating coils, and in particular to a switching and heat control mechanism for such apparatus incorporating a single control shaft for effecting individual on-off switching of the induction heating coils and individual heat control of a cooking vessel associated with the switched induction heating coil.

SUMMARY OF THE INVENTION

An object of the present invention is to provide a switching and heat control mechanism for an induction heating cooking apparatus having a plurality of induction heating work coils in which a single control shaft having a plurality of contact operating members is operatively coupled to an elevating mechanism mounting the work coil to permit switching and heat control in a single operation.

Another object of the invention is to provide a switching device having a plurality of switch contact units and a plurality of contact operating members equal in number to the switch contact units and mounted on a rotary shaft, in which the contact units have four different, sequential combinations of closed and open circuit conditions as the rotary Shaft is rotated from a normal position to effect the switching of the various points of the apparatus in stages.

A further object of the invention is to provide a switching and heat control mechanism in which the induction heating work coil is automatically de-energized when the rotary shaft is returned to a normal position.

A still further object of the invention is to provide a switching and heat control mechanism wherein a rotary shaft connected to an elevating mechanism uses a rack-and-pinion arrangement to simplify the construction of the mechanism and achieve economy.

A still further object is to provide a switching and heat control mechanism in which a spring counterbalances the weight of the elevating mechanism to minimize the moment required to rotate a control shaft.

A still further object is to provide a switching device which is free from contact wear.

DESCRIPTION OF THE DRAWINGS

The invention will be further described by way of example with reference to the accompanying drawings, in which:

FIG. 3 is a detailed perspective view of the switching and heat control mechanism of the invention;

FIGS. 6a–6d and 7a–7d are cross-sectional views taken along lines 6—6 and 7—7 respectively of FIG. 5 to illustrate the control shaft in sequential positions as it is rotated clockwise;

DESCRIPTION OF THE PREFERRED EMBODIMENT

Figure 1:
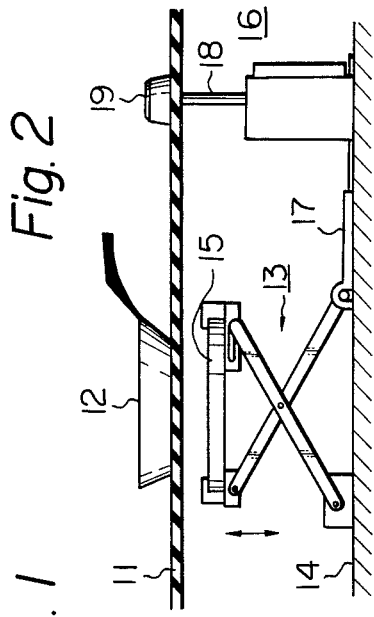
FIG. 1 is a top plan view of an induction heating cooking apparatus incorporating a plurality of switching and heat control mechanisms of the invention.
Figure 2:
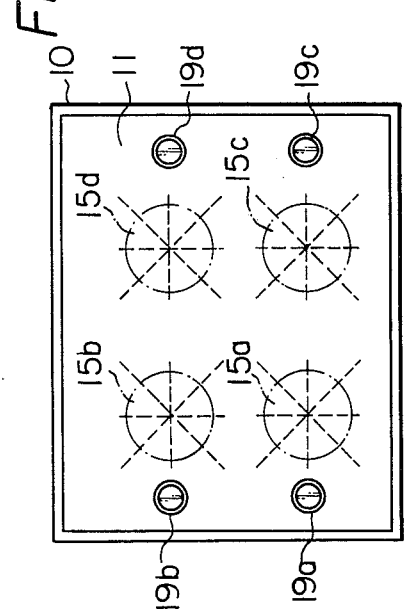
FIG. 2 is a side elevation in part of the induction heating cooking apparatus of FIG. 1.

Referring now to the drawings, particularly to FIG. 1, there is shown the top surface of an induction heating cooking apparatus 10 embodying the invention. The top surface of the cooking apparatus is formed by a ceramic plate 11 to support a plurality of cooking vessels 12 (only one is shown in FIG. 2). A cross-arm elevating mechanism 13, mounted on a chassis 14, carries induction heating helically wound flat coil 15. Elevating mechanism 13 is operatively connected by a linkage 17 to a switching and heat adjustment mechanism 16 which includes a vertical shaft 18 extending through plate 11 to carry a control knob 19. As will be described later, turning knob 19 causes ON-OFF switching of the induction coil 15 as well as a variation of the gap between the coil 15 and the cooking vessel that constitutes work load 12.

In the illustrative embodiment of the invention, four induction coils 15a, 15b, 15c and 15d are shown in broken lines in FIG. 1 with the associated switching and heat adjustment knobs 19a, 19b, 19c and 19d, respectively.

In FIG. 3 the elevating mechanism 13 is shown as comprising a pair of parallel arms 20 and 21 pivoted at the lower end to the chassis 14 by brackets 22 and 23, respectively and connected together at a point intermediate their ends by a cross member 24. The upper end of the arms 20 and 21 are provided with a pin 25 which is slidably received in a slot 26 of a block 27. To the cross member 24 is pivotally mounted arm 28 having its lower end operatively coupled to the linkage 17 by a pin 29 and its upper end pivotally coupled to a block 30. On the blocks 27 and 30 is mounted the induction heating coil 15 by means of L-shaped fixtures 31 and set screws 32.

Figure 4:
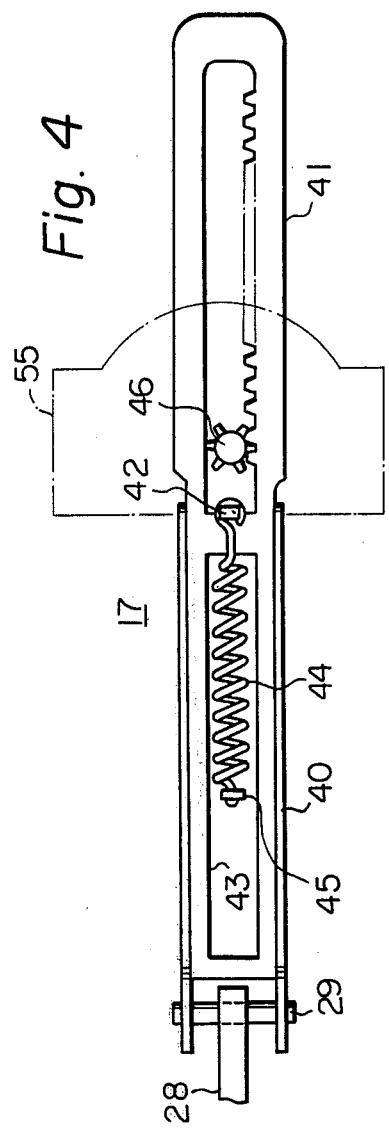
FIG. 4 is a top plan view of a rack-and-pinion arrangement.

The linkage 17 is shown clearly in FIG. 4 as comprised of an elongated member having a channelled section 40, a rack 41 and a bracket 42. An elongated opening 43 is formed on the bottom of the channel 40 and a compression spring 44 is mounted in the channel between the bracket 42 and a stationary bracket 45 which is secured to the chassis 14. The rack 41 extends underside of the switching mechanism 16 and is in mesh with a pinion 46 mounted on the shaft 18 of the mechanism 16.

Figure 5:
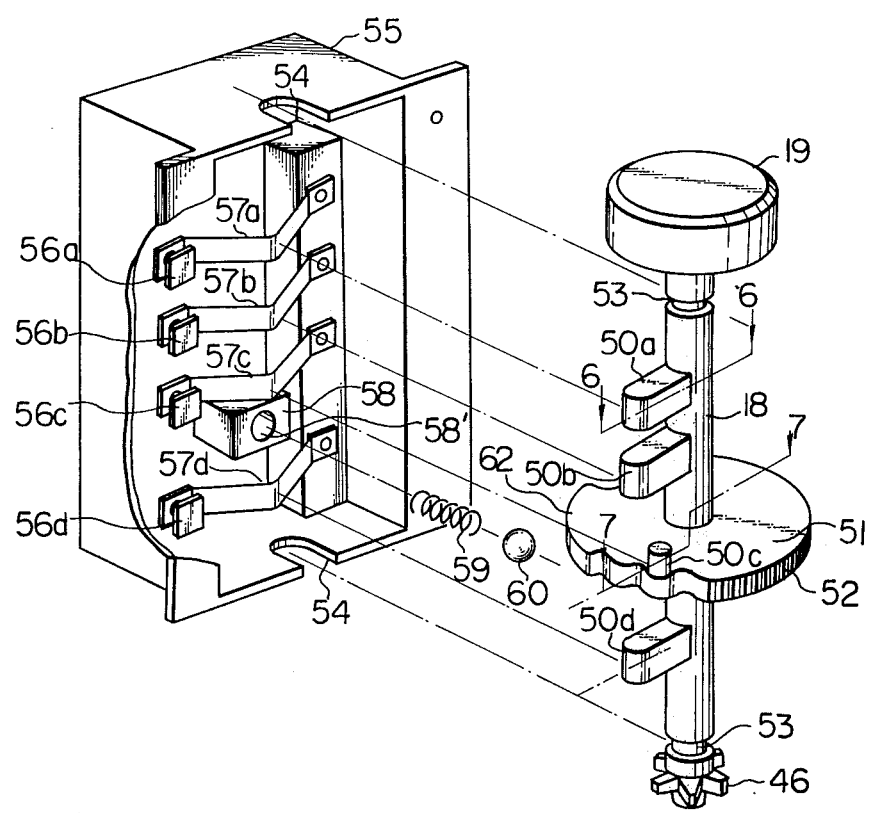
FIG. 5 is an exploded view of the switching device of the invention.
Figure 9:
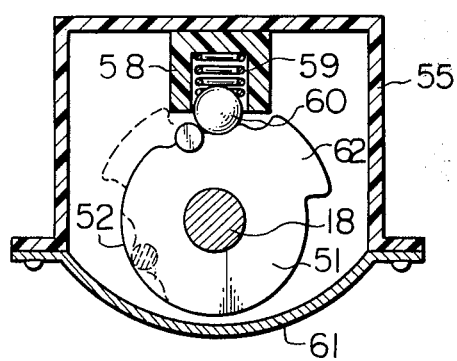
FIG. 9 is a cross-sectional view of the switching device of FIG. 3.

The switching and heat adjustment mechanism 16 is shown in detail in FIG. 5. The shaft 18 is integrally formed with a plurality of horizontally aligned, identical lugs 50a, 50b and 50d and a cam 51 formed with a cylindrical lug 50c and a toothed portion 52. The shaft 18 is further formed with a pair of reduced diameter sections 53 which are adapted to be received in cut-out portions 54 of a housing 55. In the housing 55 is arranged a plurality of stationary contacts 56a, 56b, 56c and 56d, and their associated spring contacts 57a, 57b, 57c and 57d shown as in electrical contact with the stationary contacts 56a to 56d, respectively. A block 58 is provided within the housing 55 between spring contacts 57c and 57d to receive a compression spring 59 in cylindrical hole 58' and a steel ball 60. With sections 53 of shaft 18 in the recesses 54 of the housing, the contact operating members 50a, 50b, 50c and 50d are positioned to engage the spring contacts 57a, 57b, 57c and 57d, respectively, as indicated by dot-and-dash lines, and the cam 51 is positioned to engage the ball 60. A cover 61 is secured to the housing 55 as shown in FIG. 3. When all components are assembled, the spring coil 59 is in compression by the ball 60 which engages the surface of the cam 51 to act as a detent as illustrated in FIG. 9.

The operating member 50c is angularly displaced from each of the operating members 50a, 50b and 50d so that the spring contacts 57a, 57b and 57d are normally disengaged from contact with the respective stationary contacts 56c and 57c are brought into electrical contact. As best illustrated in FIGS. 6 and 7, the turning of knob 19 in a clockwise direction produces four different circuit conditions. The operating members 50a, 50b and 50d and their associated contacts operate in an identical manner to each other. Therefore, in FIG. 6, only one operating member 50a and its associated contacts 56a and 57a are illustrated for the sake of simplicity. When the knob 19 is in the normal position as shown in FIGS. 6a and 7a, the operating member 50a is positioned to engage the spring contact 57a to disengage it from contact with contact 56a while the contacts 56c and 57c are in electrical contact with each other, and thus switch contacts 57a, 57b and 57d are in the OFF position and contact 57c is in the ON position as indicated in "condition A" in FIG. 8.

Figure 8:
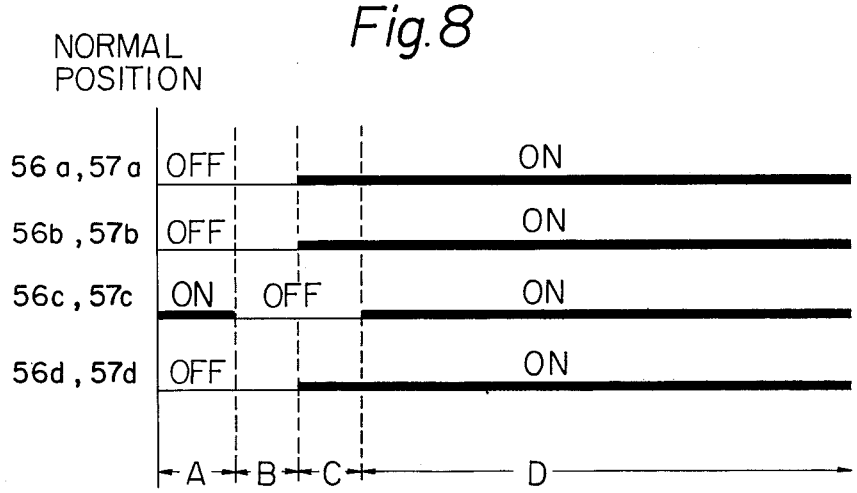
FIG. 8 is an illustration of four different combinations of closed and open circuit conditions of switch contact units arranged in the switching device of FIG. 5.

As the knob 19 is slightly turned clockwise to a position as indicated in FIGS. 6b and 7b, the spring contact 57c are moved by the operating member 50c to disengage from contact 56c and the circuit is brought to the OFF position, while the contacts 57a and 56a are still in the OFF position, so that all of the contacts are switched to OFF as indicated in "condition B" in FIG. 8.

By further clockwise turning of knob 19 contacts 56a and 57a are brought into contact with each other while the contacts 56c and 57c remain in the OFF position as shown in FIGS. 6c and 7c. Thus, in "condition C" contacts 57a, 57b and 57d are ON and contact 57c continues to be in OFF circuit condition. A further rotation of knob disengages the operating member 50c from spring contact 57c to allow it to engage contact 56c, while the contacts 56a and 57a continue to be ON, and thus in "condition D" all of the contacts are in the ON condition which continues to exist until a lug 62 of the cam 51 comes to engage the side wall of the block 58 as shown in broken lines 62' in FIG. 9.

During the condition D, the detent means 60 is in engagement with the toothed portion 52 of cam 51 to maintain the shaft 18 at any desired position.

While the knob 19 is rotated clockwise, the rotation of pinion 46 moves the rack 41 to the left, so that the coil 15 is raised to an upper position. It will be understood therefore that when the switch contacts are in the normal position in which all contacts except for contact 57c are in the OFF condition, the induction heating coil 15 is in the lowest position and at the extreme end of the clockwise rotation of shaft 18 the coil 15 is in the highest position.

Figure 10:
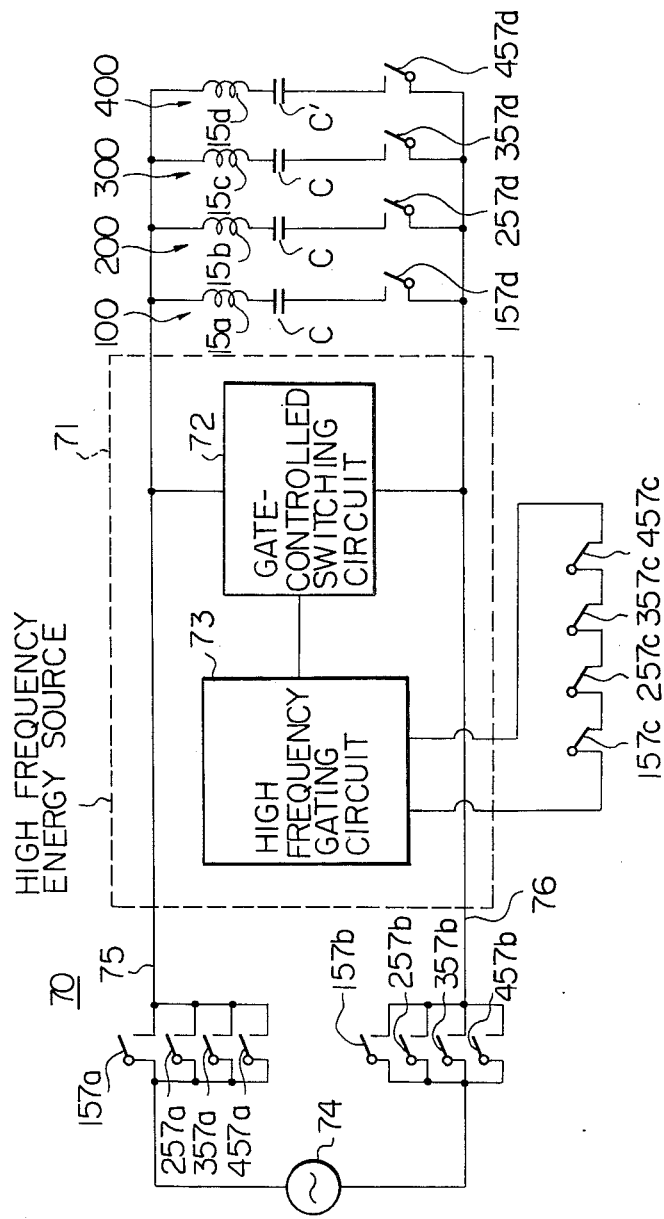

FIG. 10 illustrates an embodiment of the induction heating cooking apparatus in which the switching and heat control mechanism as described above is employed. The induction heating apparatus 70 includes a high frequency energy source shown in broken-line rectangle 71 which includes a gate-controlled switching circuit 72 connected to a low frequency alternating voltage source 74 through bus lines 75 and 76, and a high frequency gating circuit 73 for gating the switching circuit into conduction at the high frequency rate in a manner well known in the art of high frequency generation. Bus lines 75 and 76 are connected to series-connected LC commutation circuits 100, 200, 300 and 400 through respective ones of contacts 157d, 257d, 357d and 457d, identical numerals are used to designate in the tenth and unit numbers corresponding parts of the switching mechanism 16, and the hundred number is used to designate the corresponding LC load circuit.

Each load circuit includes the induction heating coil 15 in series with a commutation capacitor C to provide a resonant circuit for the switching circuit 72. Each of the commutation circuits has a relatively low impedance to the high frequency current generated by the gate-controlled switching circuit 72, and a relatively high impedance to the low frequency alternating voltage source 74. With the switching circuit 72 gated into conduction in a given direction, a forward current flows through the LC load circuit and the respective contact 57d to reversely bias the capacitor C, the reverse bias on capacitor C causes a backward commutating current to flow through the switching circuit 72 which is now gated into conduction in the opposite direction to pass the backward current. The forward and backward flow of currents through the LC circuit produces a time-varying electromagnetic field at a high frequency in the inaudible range; the field generates heat in the vessel 12 because of eddy currents resulting from inductive coupling between the vessel and coil 15.

Parallel contacts 157a, 257a, 357a and 457a connect one terminal of source 74 to bus line 75; the other terminal of source 74 is connected through parallel contacts 157b, 257b, 357b and 457b to bus line 76. The ON-OFF switching of the gating circuit 73 is controlled by a series-connected normally closed contacts 157c, 257c, 357c and 457c.

To describe the operation of the circuit, assume that it is desired to energize the coil 15a. Clockwise rotation of the control knob 19a breaks the contact 157c during the condition B (FIG. 8) and while clockwise rotation of knob 19a continues and contacts 157c remain in the OFF condition the contacts 157a and 157b are closed to connect the AC power source 74 to the bus lines 75 and 76, simultaneously with contact 157d being closed to connect load circuit 100 to the switching circuit 72. With continued clockwise rotation of knob 19a, contact 157c closes as the switch conditions enter "D," whereby the gate-controlled switching circuit 72 is connected to the power source 74, the high frequency gating circuit 73 is brought into action. This delayed energization of the gating circuit 73 avoids the occurrence of a surge current flow through the contacts 157a, 157b and 157d at the instant when they are operated to provide closed circuit conditions, so that wear of these contacts is minimized.

Further clockwise rotation of the control knob 19a raises the induction heating coil 15a to a desired position so that the gap between it and the work load 12 can be adjusted to provide a desired degree of inductive coupling therebetween.

Successive energization of work coil 15b is made possible by the clockwise rotation of the control knob 19b from its normal position. This momentarily cuts off the operation of the gating circuit 73, but does not affect the energization of the previously operating coil 15a. Heat adjustment for each work load can be achieved individually by means of the control knob 19 without causing any interfering effect with another work coil.

Counterclockwise rotation of the respective control knob lowers the associated induction heating coil to increase the gap between it and the work load until the associated work coil is automatically de-energized whereby energy is not wasted when the control knob 19 reaches the normal position. During this process, the gating circuit 73 is de-energized to cut off high frequency energization current for coil 15a prior to disconnection of switching circuit 72 from the power source in order to allow the associated power-circuit contacts to open during the inactive state. This early opening of contact 57c upon deenergization of the coil 15a has the same effect as provided in switching the work coil to the energized state.

The elevating mechanism 13 is always urged upwardly by the spring 44 so that its weight, including the weight of the induction coil 15, is substantially counterbalanced to minimize the power required to rotate the shaft 18 when the coil is raised, while braking action is provided when the coil is lowered.

What is claimed is:

1. Induction heating cooking apparatus having a non-metallic cook top on which cooking vessels are adapted to be placed, comprising a gate-controlled switching circuit, a high frequency gating circuit for gating on said gate-controlled switching circuit into conduction successively in opposite directions at the high frequency rate, a plurality of commutation circuits each including an induction heating coil and a capacitor connected in series, and a switching and heat control mechanism for each of said commutation circuits, the switching and heat control mechanism comprising:
   (a) an elevating mechanism mounted on a chassis for carrying an associated induction heating coil at an adjustable position relative to said cook top;
   (b) a switching device comprising:
      (1) a rotary shaft;
      (2) a control knob connected to one end of said shaft;
      (3) first, second and third switch contact units, the first contact unit being arranged to connect said gate-controlled switching circuit to be responsive to power derived from a low frequency alternating voltage source in parallel with the first switch contact units of the other switching and heat control mechanisms, the second contact unit being arranged to connect an associated commutation circuit to said gate-controlled switching circuit, the third switch contact unit being connected in series with the third switch contact units of the other switching and heat control mechanisms to control the energization of said high frequency gating circuit; and
      (4) first, second and third contact operating members mounted along the length of said shaft at such positions as to engage the first, second and third switch contact units respectively to allow the same to assume one of open and closed circuit conditions, the points of engagement of said first and second contact operating members with the corresponding switch contact units being axially aligned with each other and the point of engagement of said third contact operating member with the corresponding switch contact unit being angularly displaced from the points of engagement of said first and second contact operating members, wherein the points of engagement of the first, second and third contact operating members are positioned to allow the corresponding switch contact units to assume one of different combinations of open and closed circuit conditions in sequence as the shaft is rotated from a normal position in which the associated induction heating coil is inactive;
   (c) means connected at one end to said shaft for translating the rotational movement of said rotary shaft into a reciprocating movement and connected at the other end to said elevating mechanism to transmit the reciprocating movement thereto to thereby cause it to move the associated induction heating coil relative to said cook top, the connection thereof to said rotary shaft being such that when said shaft is in the normal position the gap between the associated induction heating coil and the cook top is at the greatest.

2. Induction heating cooking apparatus as claimed in claim 1, wherein said different combinations of open and closed circuit conditions include:
   a first occurring combination in which only the third contact unit is in the closed circuit condition when said rotary shaft is in the normal position;
   a second occurring combination in which all of the contact units are in the open circuit condition;
   a third occurring combination in which only the third contact unit is in the open circuit condition; and
   a fourth occurring combination in which all of the contact units are in the closed circuit condition.

3. Induction heating cooking apparatus as claimed in claim 1, wherein said switching device further comprises a cam mounted on said rotary shaft, a ball and means for urging the ball against the camming surface of said cam.

4. Induction heating cooking apparatus as claimed in claim 1, further comprising means for counterbalancing a downward movement of said elevating mechanism.

5. Induction heating cooking apparatus as claimed in claim 4, wherein said movement translating means comprises a pinion mounted on said rotary shaft for rotation therewith, a rack in mesh with the pinion and operatively connected at one end to said elevating mechanism, and wherein said counterbalancing means comprises a compression spring mounted to urge the rack in a direction that causes the elevating mechanism to move the associated induction heating coil in the direction toward said cook top.

6. Induction heating cooking apparatus as claimed in claim 5, wherein said elevating mechanism comprises a pair of first and second parallel arms connected together by a transverse member and pivotally connected at one end to said chassis, a third arm pivotally mounted on said transverse member to provide a cross arm configuration with said first and second arms and operatively connected at one end to one end of said rack, and means for slidably coupling the other ends of said first and second arms to said induction heating coil and pivotally coupling the other end of said third arm to said induction heating coil.

7. Induction heating cooking apparatus as claimed in claim 1, wherein said rotary shaft of the switching device extends through said cook top and said control knob is connected to the upper end of said shaft above said cook top.

8. The apparatus of claim 1 wherein each of the commutation circuits has a relatively low impedance to the high frequency current generated by said gate-controlled switching circuit and a relatively high impedance to the frequency of the low frequency alternating voltage source.

9. The apparatus of claim 1 wherein each of the commutation circuits is resonant to the frequency of current derived by the high frequency gating circuit.

10. The apparatus of claim 1 wherein the rotary shaft is a single shaft connected between the control knob and the first, second and third contact operating members.

* * * * *